United States Patent
Yasui et al.

(10) Patent No.: US 6,483,429 B1
(45) Date of Patent: Nov. 19, 2002

(54) PARKING ASSISTANCE SYSTEM (75) Inventors: Nobuhiko Yasui, Moriguchi (JP);
Atsushi Iisaka, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 33 days.

(21) Appl. No.: 09/692,540

(22) Filed: Oct. 20, 2000

(30) Foreign Application Priority Data

Oct. 21, 1999 (JP) .......................................... 11-299637

(51) Int. Cl.[7] ................................................. B60Q 1/00
(52) U.S. Cl. ..................... 340/435; 340/903; 340/932.2; 348/118; 348/148
(58) Field of Search ................................ 340/903, 435, 340/932.2, 937, 958, 436; 348/118, 148, 149; 382/106; 356/1

(56) References Cited

U.S. PATENT DOCUMENTS

| | | | |
|---|---|---|---|
| 5,151,945 A | * 9/1992 | Lee et al. ..................... 382/37 |
| 5,307,136 A | 4/1994 | Saneyoshi ................... 180/167 |
| 5,355,118 A | * 10/1994 | Fukuhara ..................... 340/435 |
| 5,574,443 A | * 11/1996 | Hsieh .......................... 340/901 |
| 5,612,686 A | * 3/1997 | Takano et al. ................ 340/903 |
| 5,646,614 A | * 7/1997 | Abersfelder et al. .......... 340/932.2 |
| 6,172,601 B1 | * 1/2001 | Wada et al. ................. 340/436 |

FOREIGN PATENT DOCUMENTS

| | | |
|---|---|---|
| DE | 4238599 | 6/1994 |
| EP | 0740163 | 10/1996 |
| JP | 5-114099 | 5/1993 |

* cited by examiner

Primary Examiner—Brent A. Swarthout
(74) Attorney, Agent, or Firm—Wenderoth, Lind & Ponack, L.L.P.

(57) ABSTRACT

A parking assistance system is mounted in a vehicle, and has an image pick-up with a single camera, an image processing device, a display, a steering angle sensor, a wheel speed sensor, and a pulse counter. An A/D converter subjects two analog images picked up by the image pick-up at different locations to A/D conversion, and sends the results to frame memories. A CPU uses the digital image data and the transition data of the vehicle to calculate object data and a distance from the vehicle to the 3D object. An image thus obtained is then converted into a view from the above. The view from the above is stored in a frame memory, and outputted to the display under the control of a controller for display.

17 Claims, 12 Drawing Sheets

PARKING ASSISTANCE SYSTEM

BACKGROUND OF THE INVENTION

1. Field of the Invention

The present invention relates to systems for assisting a driver of a vehicle to park via an image of around the vehicle and, more specifically, to a system for calculating a distance from the vehicle to a specific 3D object in the image picked up from the vehicle and advising the driver of what is located around the vehicle.

2. Description of the Background Art

Conventional technologies so far disclosed as relevant to vehicles, such as automobiles, include detecting any obstacle around a vehicle, for example. If any obstacle is detected, and if a collision with the obstacle is determined as being highly possible, a driver of the vehicle is warned by alarm, advised of a distance to the obstacle, or according to the distance, the vehicle is automatically braked to stop. As an example of such detection means, there is a distance detection system utilizing an image recognition technology, such as disclosed in Japanese Patent Laid-Open No. 5-114099 (93-114099). Utilized in this system is an image picked up by a camera mounted in a vehicle.

The distance detection system is now described with reference to FIGS. 11 and 12. Specifically, FIG. 11 is a diagram showing the relationship between a camera and a 3D object, while FIG. 12 a block diagram showing the distance detection system.

In the distance detection system, a vehicle, such as in an automobile, is equipped with a stereo optical system for picking up an image of the 3D object located outside of the vehicle within a given range. The stereo optical system is exemplarily implemented by several cameras utilizing a solid image-pickup device, such as a charge-coupled device (CCD), and each fixedly attached to a ceiling surface of the vehicle towards its front. Here, the number of cameras is presumably two, and the camera located on the right, as viewed from the front, is referred to as the right camera, and the other camera on the left is as the left camera.

Figure 11:
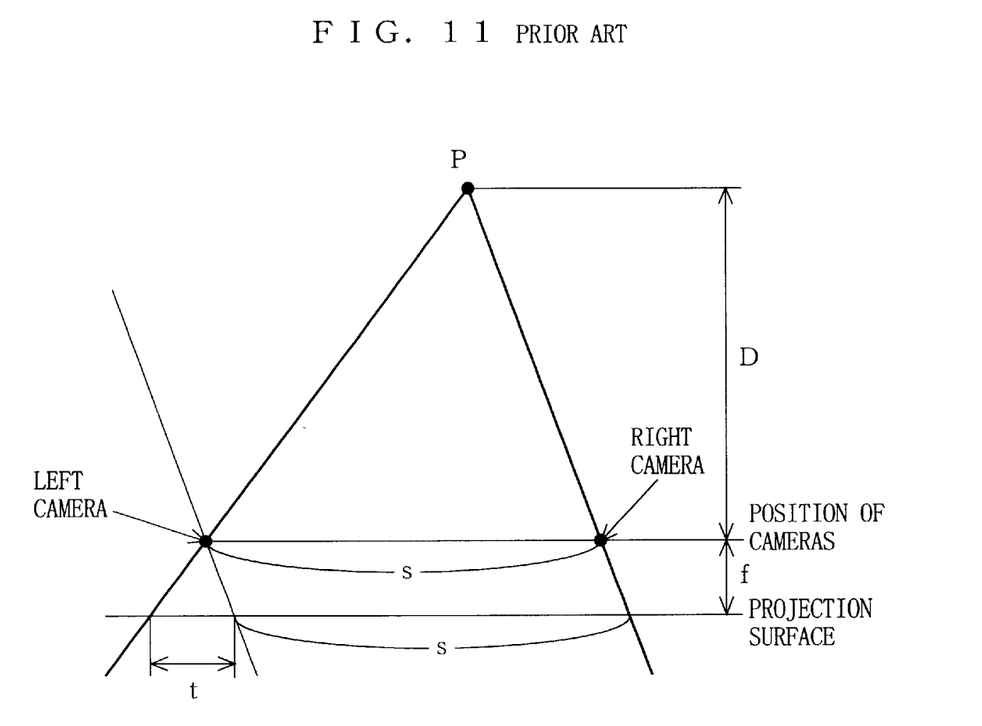
FIG. 11 is a diagram showing the relationship between a camera and a 3D object by a conventional distance detection system disclosed in Japanese Patent Laid-Open No. 5-114099.
Figure 12:
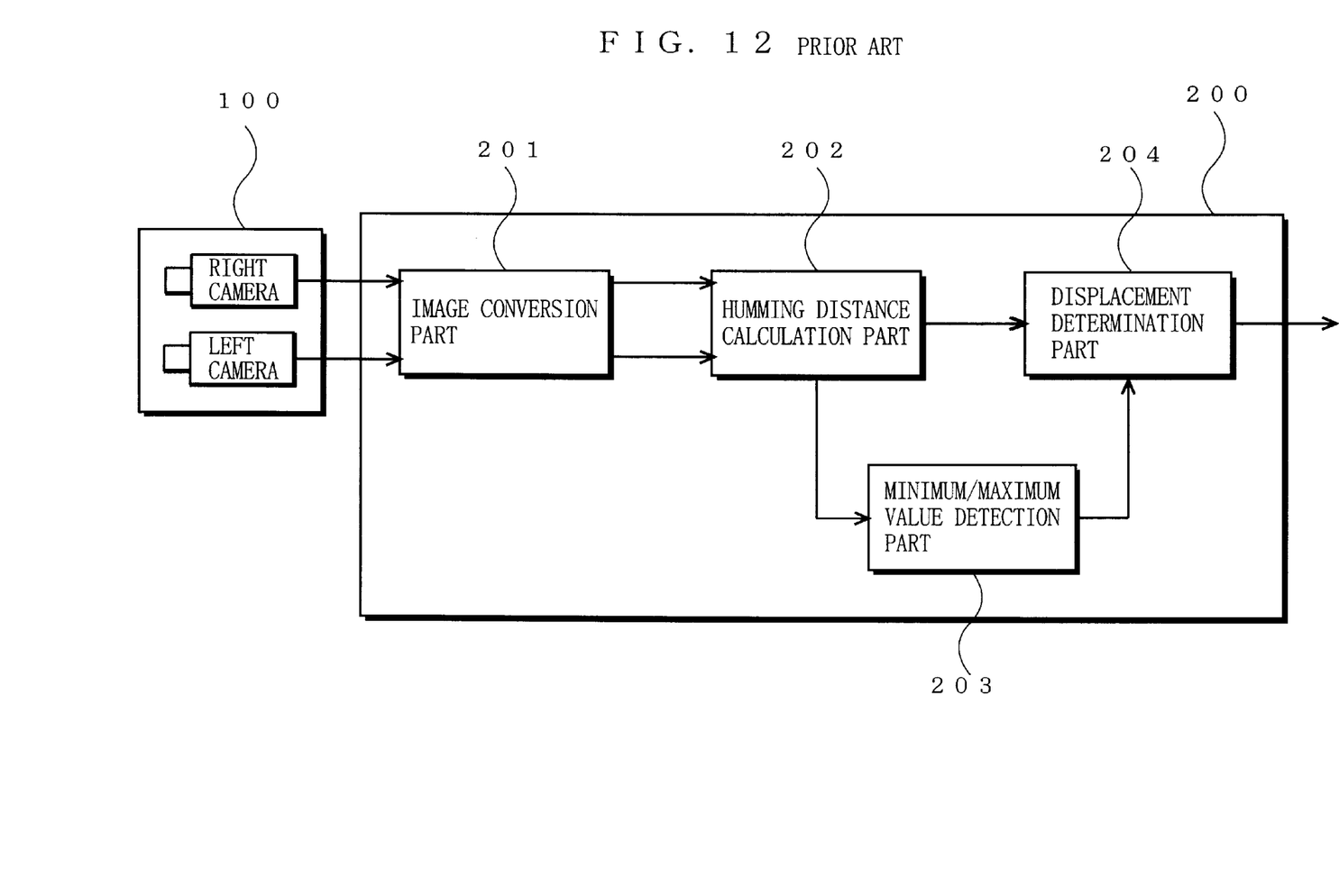
FIG. 12 is a block diagram showing the conventional distance detection system.

In FIG. 11, the right and left cameras are placed so as to be away from each other by a distance s, and each of the cameras photograph a point P at a perpendicular distance D therefrom. Assuming a focal distance for both cameras being f, an image of the point P is picked up on each camera's projection surface, which is away from the camera by the focal distance f. In this case, the distance between these two images on the projection surfaces is s+t, where t denotes a displacement. Thus, the distance D is so calculated as follows:

$$D = s*f/t$$

That is, the displacement t leads to the distance D.

Described next is the process of calculating the displacement t. In FIG. 12, a stereo optical system 100 forwards data two of analog images picked up therein to an image processing part 201. The two analog image data are then subjected to an A/D conversion for output to a hamming distance calculation part 202. The two digital image data are then calculated, respectively, for a hamming distance H on a pixel basis. The hamming distances H are used to determine the displacement of the two images. A minimum/maximum value detection part 203 then searches the hamming distances H calculated by the hamming distance calculation part 202 for a minimum value Hmin and a maximum value Hmax. It is herein assumed that the minimum value Hmin is the displacement t.

As such, the distance detection system 200 processes two images picked up by a stereo camera mounted in a vehicle, and finds the displacement t. Thereby, the system can assist a driver with a 3D position of an obstacle, for example, and a warning alarm is possible to prevent against a collision or bump.

Such a distance detection system, however, requires considerable accuracy for fixedly attaching several cameras of the stereo optical system to a vehicle, especially with regard to angle, direction, interval, and the like. There also needs to be previously input, to a stereo image processing device, data indicating the satisfactory positions of those cameras. As a result, structuring such a stereo optical system is very difficult. Further, as described in the foregoing, in order to calculate the hamming distances H, object detection needs to be performed for one image with reference to the other image in their entirety. Also, the search on the pixel basis needs to be repeated, the amount of calculation is thus quite large, and the hardware structure is complicated. Still further, the distance to an obstacle advised by this distance detection system is often in numerical figures or by images being quite different in appearance from the actual obstacle. Therefore, the driver cannot quite perceive the actual distance.

SUMMARY OF THE INVENTION

Therefore, an object of the present invention is to provide a parking assistance system for assuredly advising a driver of a distance between his/her vehicle and an obstacle in a perceivable manner, while easing attachment of an image pick-up to the vehicle and reducing the number of calculations required for image processing.

The present invention has the following features to attain the above object.

An aspect of the present invention is directed to a parking assistance system for assisting a driver of a vehicle to park by picking up an image around the vehicle, and advising the driver of a 3D object located therearound. The system comprises an image pick-up for picking up, with a single camera during the vehicle's transition, first and second images around the vehicle picked up at a different location and first and second times, an object specification part for detecting and specifying the 3D object found in each of the first and second images, a vehicle position calculation part for calculating transition data of the vehicle from the first location to the second location, an object distance calculation part for calculating a distance from the vehicle to the 3D object by using the position of the 3D object in each of the first and second images, and the transition data of the vehicle, and an image creation part for creating a third image for display to the driver based on the images picked up by the image pick-up and data calculated by the object distance calculation part.

As described above, in the aspect of the present invention, as is provided with a single image pick-up, the parking assistance system picks up two images at different location and time, and calculates the transition data of the vehicle between the two locations. Therefore, with the principle of triangulation applied to the 3D objects in two images, the parking assistance system can correctly calculate the distance to the 3D object. Accordingly, one image pick-up will do, and the parking assistance system achieves easy attachment thereof as having no more need to fixedly attaching several image pick-ups with considerable accuracy, especially with regard to angle, direction, interval, and the like. Further, the data calculated by the object distance calculation part correctly indicates the distance from the vehicle, and thus the third image will not be askew and tell the correct distance. Still further, by displaying the image onto which the distance data is added, the actual distance from the vehicle to the 3D object is easier for the driver.

The object distance calculation part preferably detects edges of each of the 3D objects found in the first and second images. Also, the object distance calculation part uses the coordinate data of any edge identical in the first and second images and the transition data of the vehicle so that the distance from the vehicle to the edge of the 3D object is calculated. Therefore, even if the vehicle moves in a complex fashion, the distance to the 3D object can be easily calculated with only the coordinates data of any edge identical in the two images and the transition data of the vehicle. Further, in order to detect any identical edge, by using the transition data of the vehicle, the object distance calculation part may estimate the position of the edge identical in the first and second images, and then positionally subjects the edge to image analysis. In this case, since the transition data of the vehicle has been previously calculated, the positional relationship between the two images is clarified. This makes possible to estimate which edge in one image is located where in the other image, and image analysis is only done for the estimated part of the image, reducing the amount of calculation used for the edge detection. Moreover, the hardware structure can be simplified.

The image creation part preferably converts the image picked up by the image pick-up into a view from the above, and then creates a third image by adding the data calculated by the object distance calculation part onto the view. With the help of such created third image on the display, the driver can grasp the actual distance from the vehicle to the 3D object. Alternatively, the image creation part may perceivably emphasize, out of the data calculated by the object distance calculation part, a part of the object in the vicinity of the vehicle. Thereby, out of the data calculated by the object distance calculation part, a part of the object in the vicinity of the vehicle may be emphasized by color, line width, or the like, to let it stand out to warn the driver against approaching 3D object. The image creation part also may generate the third image by converting the data calculated by the object distance calculation part into a 3D object model, and adding the 3D object model onto the view from the above. As such, by adding the close-to-actual 3D object model onto the view from the above, the driver is warned about the 3D object, and it also becomes easier to perceive the distance between the 3D object and the vehicle. Or, the image creation part may additionally add a model of the vehicle onto the third image. As it is equipped in the vehicle, the image pick-up cannot pick up an image of the vehicle in its entirety. In this sense, the image is not complete, and thus the driver may have a hard time grasping the actual distance from the vehicle to the 3D object. To get around such a problem, the model of the vehicle is fixedly displayed on the third image.

The object specification part, as an example, generates a fourth image by projecting the first image onto the second location for transformation, and then takes a difference between the fourth and second images to detect and specify the 3D object. Alternatively, the object specification part may generate the fourth image by projecting the second image onto the first location for transformation, and then takes a difference between the fourth and first images to detect and specify the 3D object. Either structure will do to detect and specify the 3D object in the image in an easy manner. This is because, due to the extraction of such differences between one image actually picked up and the other obtained by projecting the former image thereonto, only any askew part is left behind.

The transition data of the vehicle typically includes the linear transition distance and the vehicle angle of the vehicle. In such a case, based on data obtained from a steering angle sensor and wheel speed sensor via a pulse counter equipped in the vehicle, the vehicle position calculation part calculates the transit distance and the vehicle angle.

The image pick-up is preferably equipped at a rear part of the vehicle having many blind spots, especially when parking, thereby rendering the parking assistance system more useful. This is especially applicable to a large-sized vehicle.

In a preferable example, the above-described third image is displayed on the display for the driver. Since the third image looks quite close to the actual image, it allows the driver to easily perceive the actual distance.

Further, in another preferable example, when the distance from the vehicle to the 3D object calculated by the object distance calculation part is shorter than a predetermined distance, a sound and/or light is generated. Thereby, the driver can be warned against the approaching 3D object.

The image pick-up may be conditionally started in various manners. First, the system may start picking-up an image in response to the manual operation of the driver. If this is the case, the driver can selectively start the parking assistance system only when he/she needs its assistance. Second, the system starts when the vehicle decelerates to a predetermined speed. Third, the system starts when the vehicle goes in reverse. According to the second and third conditions, the vehicle can tell whether its in a parking mode or not. Thus, the parking assistance system can be started only when the vehicle is in the parking mode.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
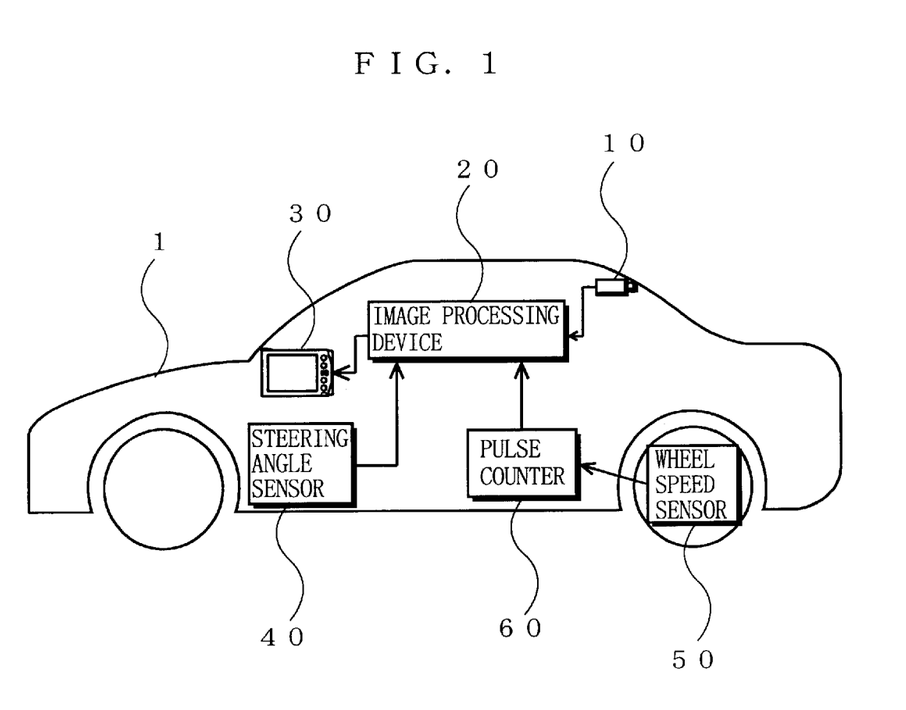
FIG. 1 is a diagram showing an entire structure of a parking assistance system according to an embodiment of the present invention.
Figure 2:
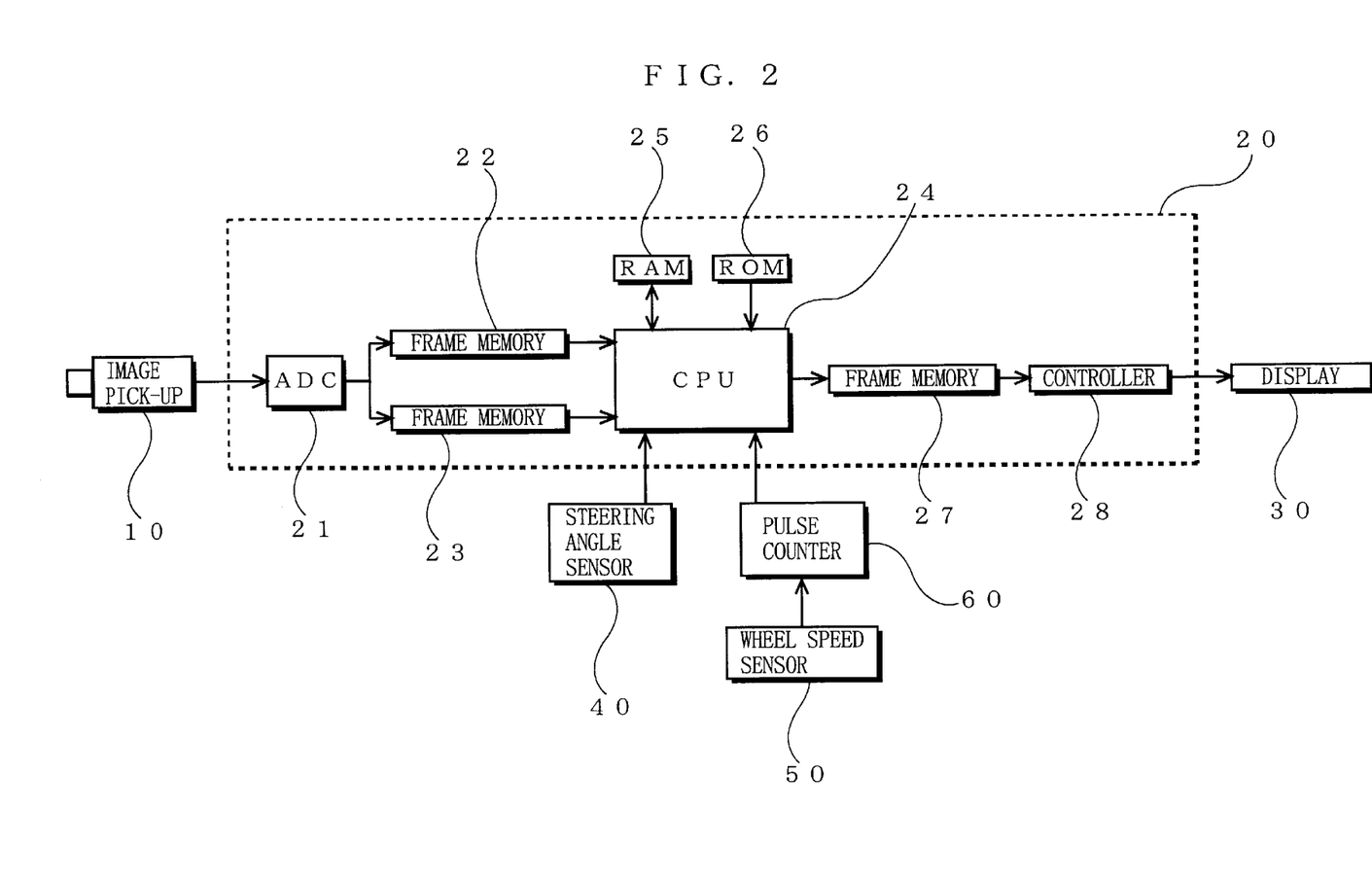
FIG. 2 is a circuit block diagram of the parking assistance system.
Figure 3:
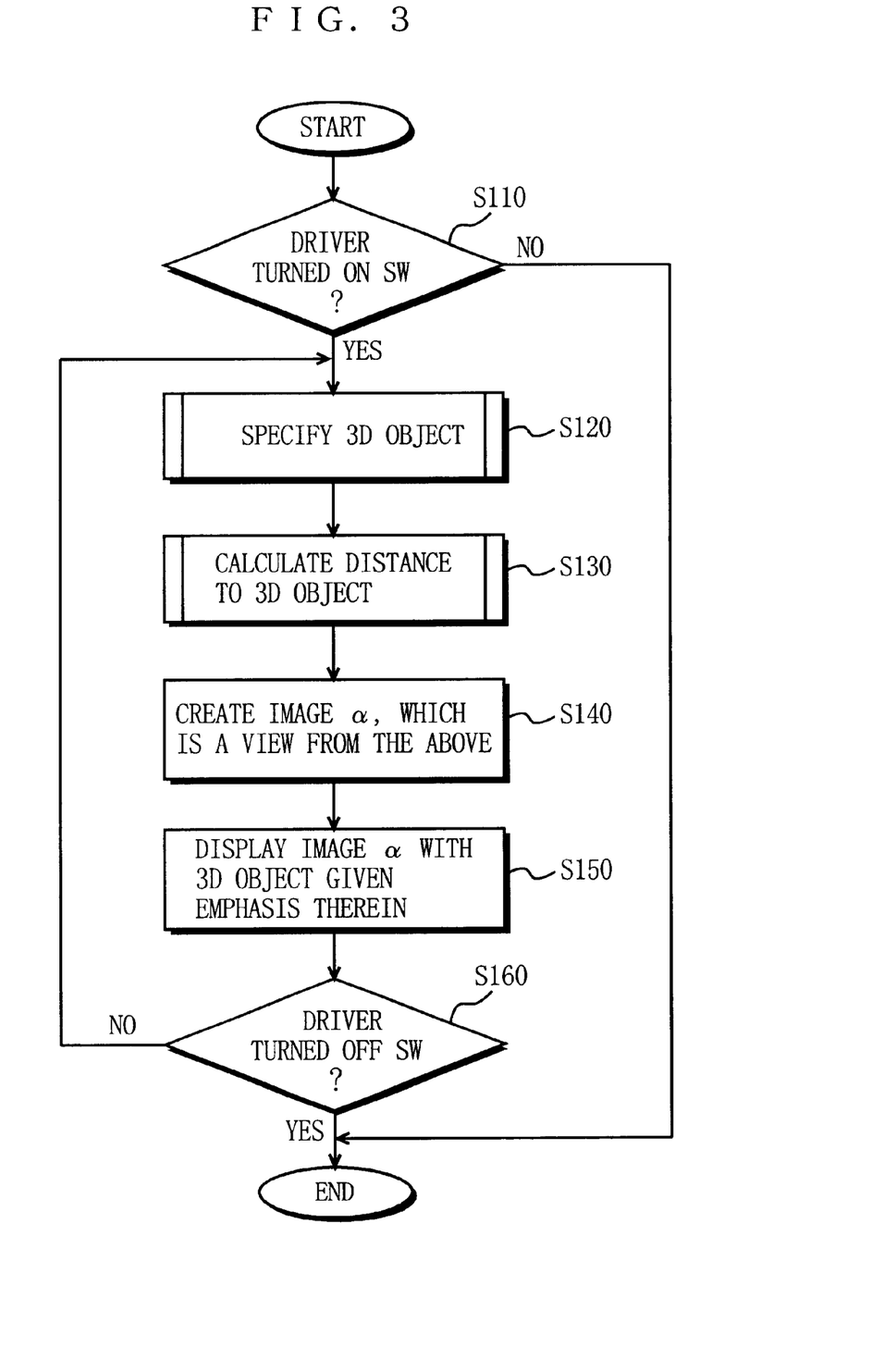
FIG. 3 is a flowchart showing the comprehensive operation of the parking assistance system.
Figure 4:
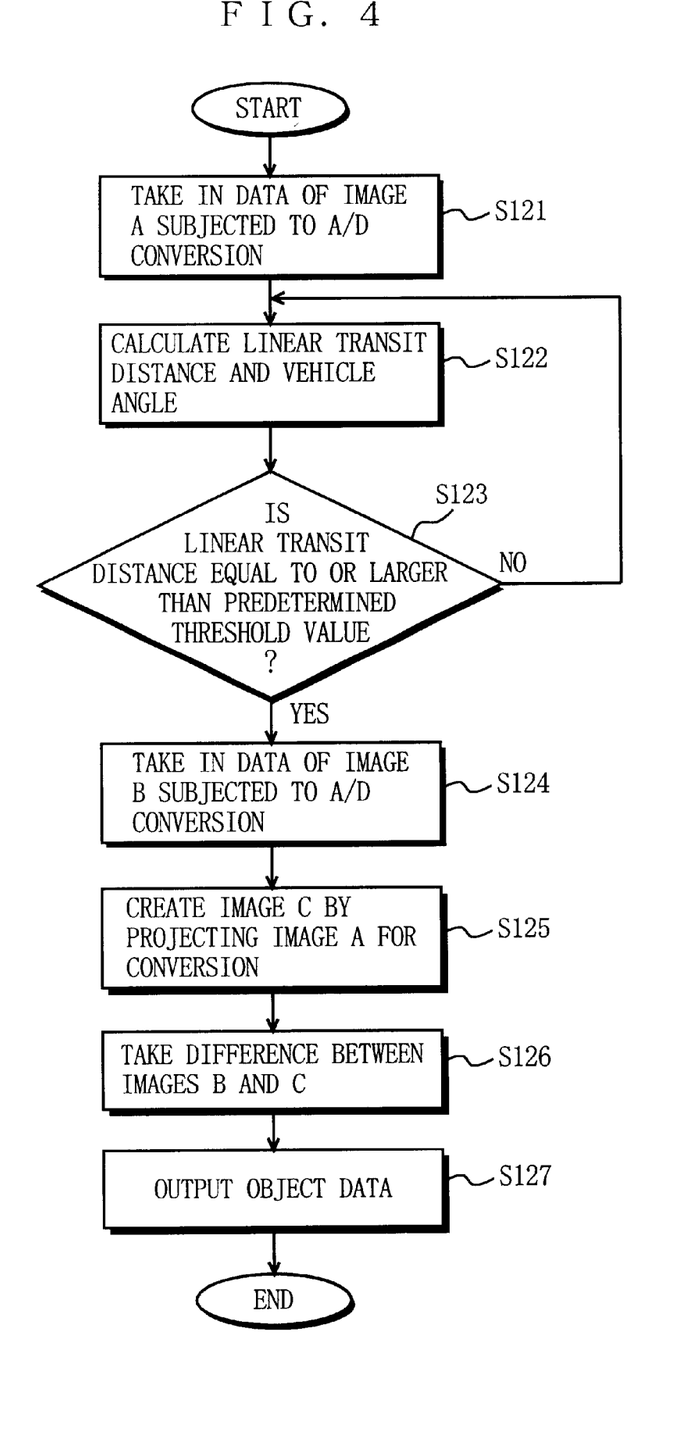
FIG. 4 is a flowchart showing the specific operation for object specification by the parking assistance system.
Figure 5A:
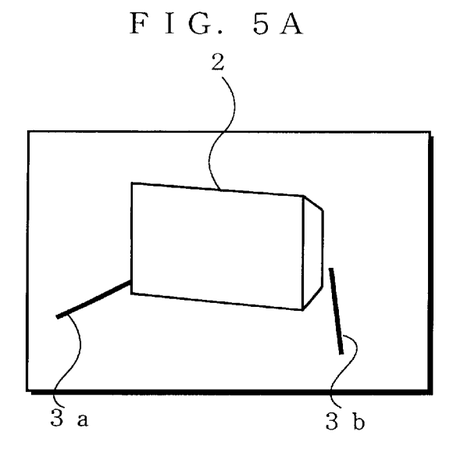
FIGS. 5a to 5d are diagrams for assistance of explaining image processing executed for object specification by the parking assistance system.
Figure 5B:
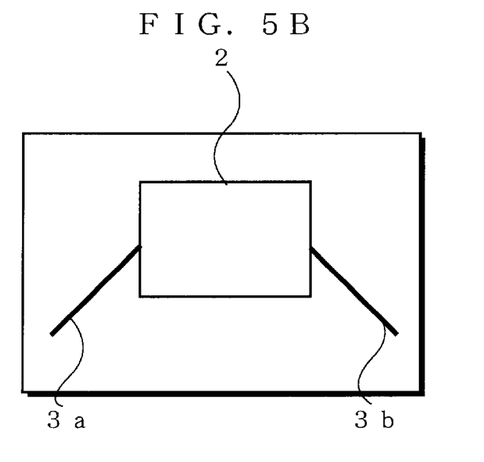
Figure 5C:
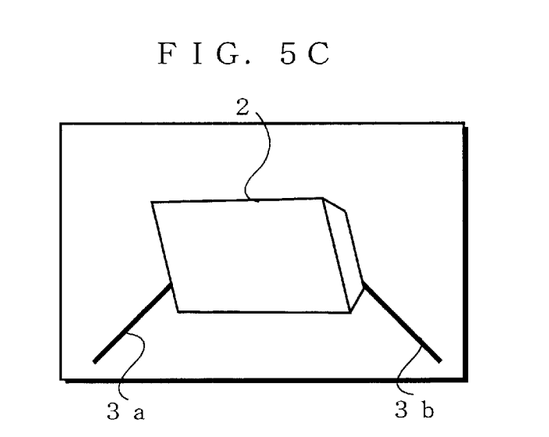
Figure 5D:
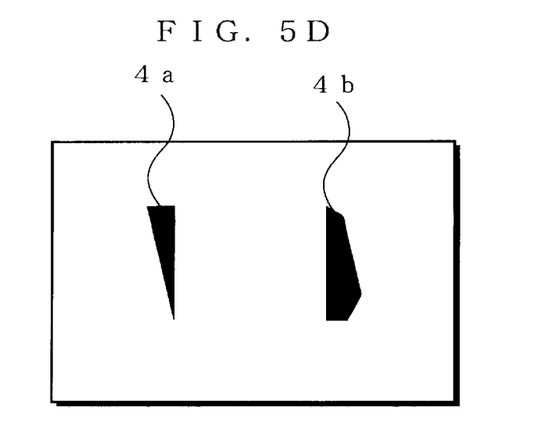
Figure 6:
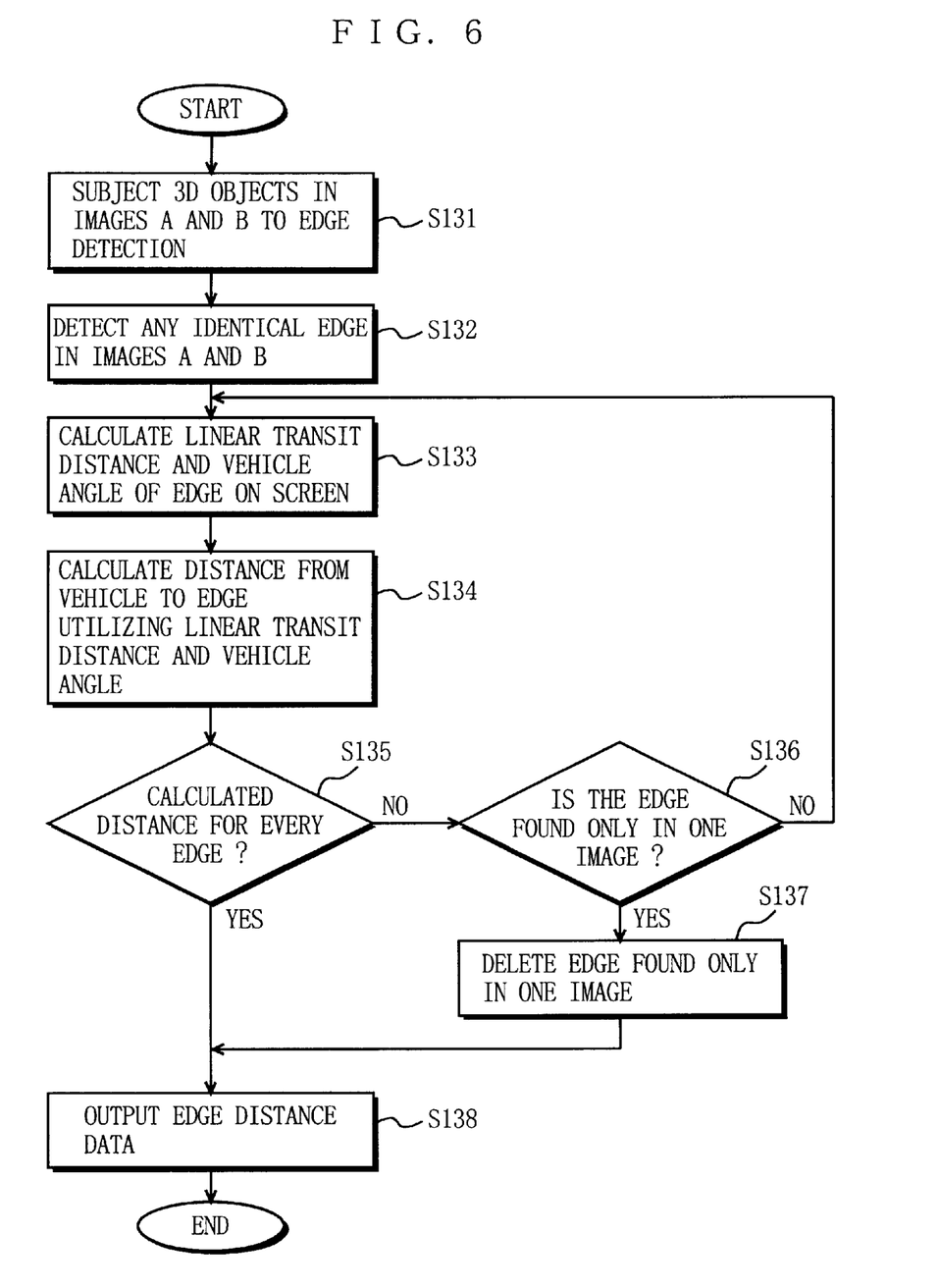
FIG. 6 is a flowchart showing the operation for calculating a distance to a 3D object by the parking assistance system.
Figure 7A:
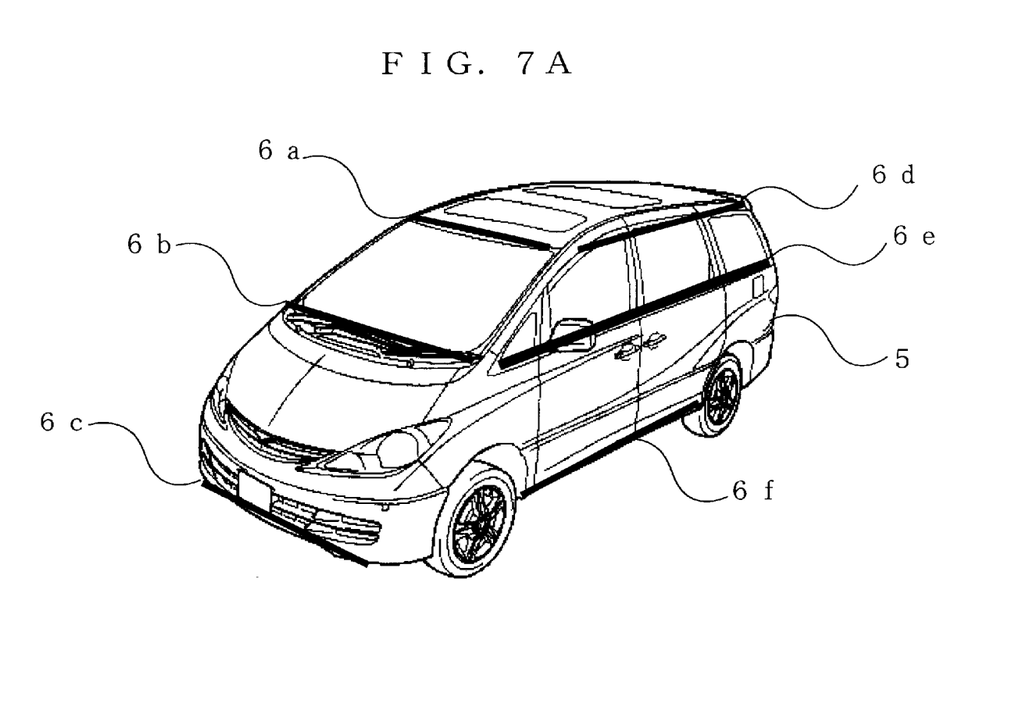
FIGS. 7a and 7b are diagrams for assistance of explaining edge detection in the 3D object by the parking assistance system.
Figure 7B:
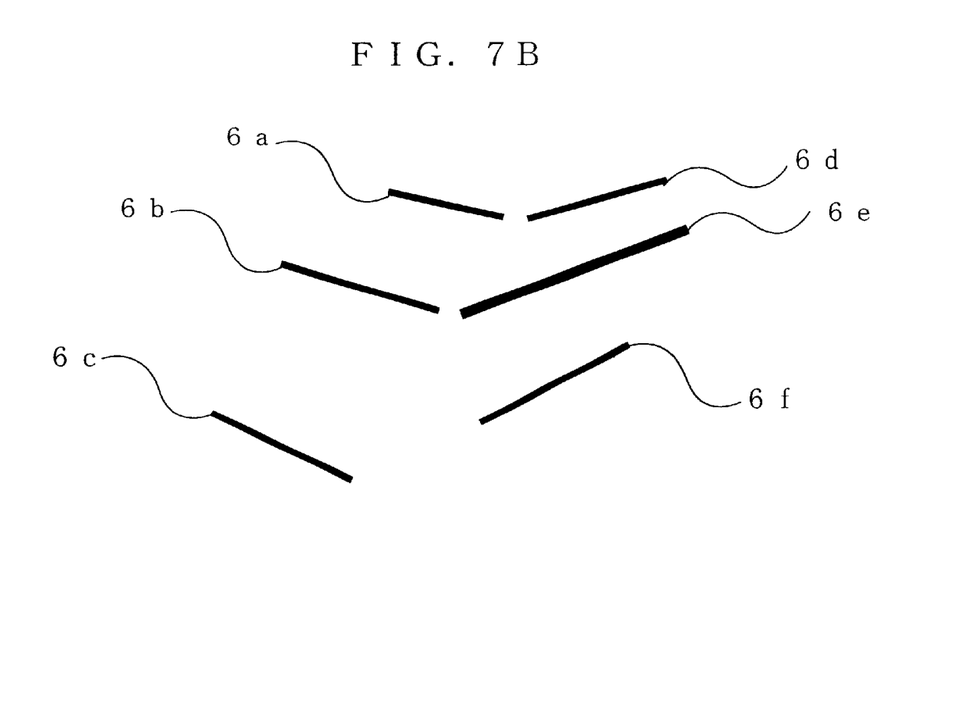
Figure 8:
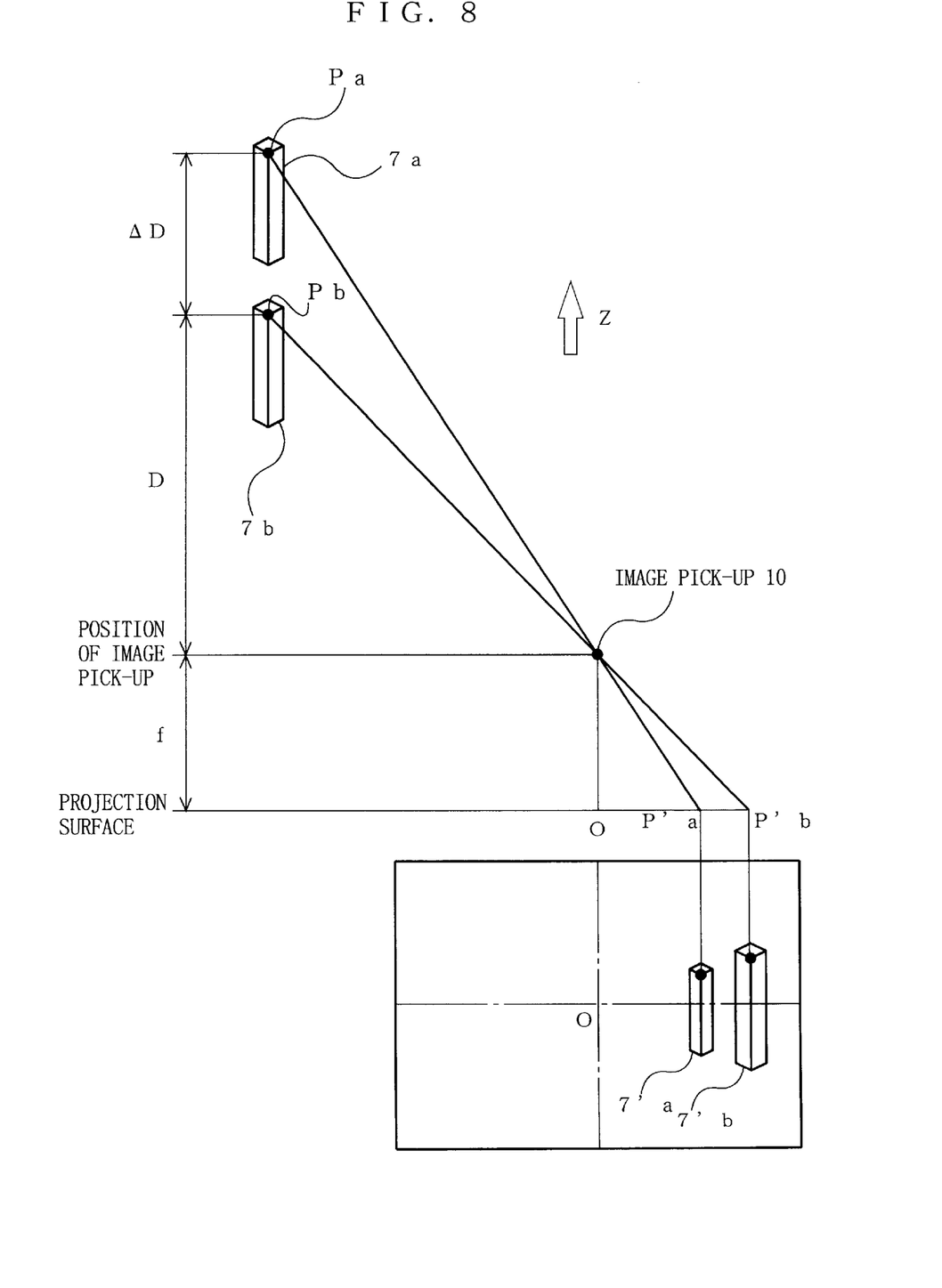
FIG. 8 is a diagram for assistance of explaining a method of calculating a distance to the 3D object when a driver has the vehicle go straight.
Figure 9:
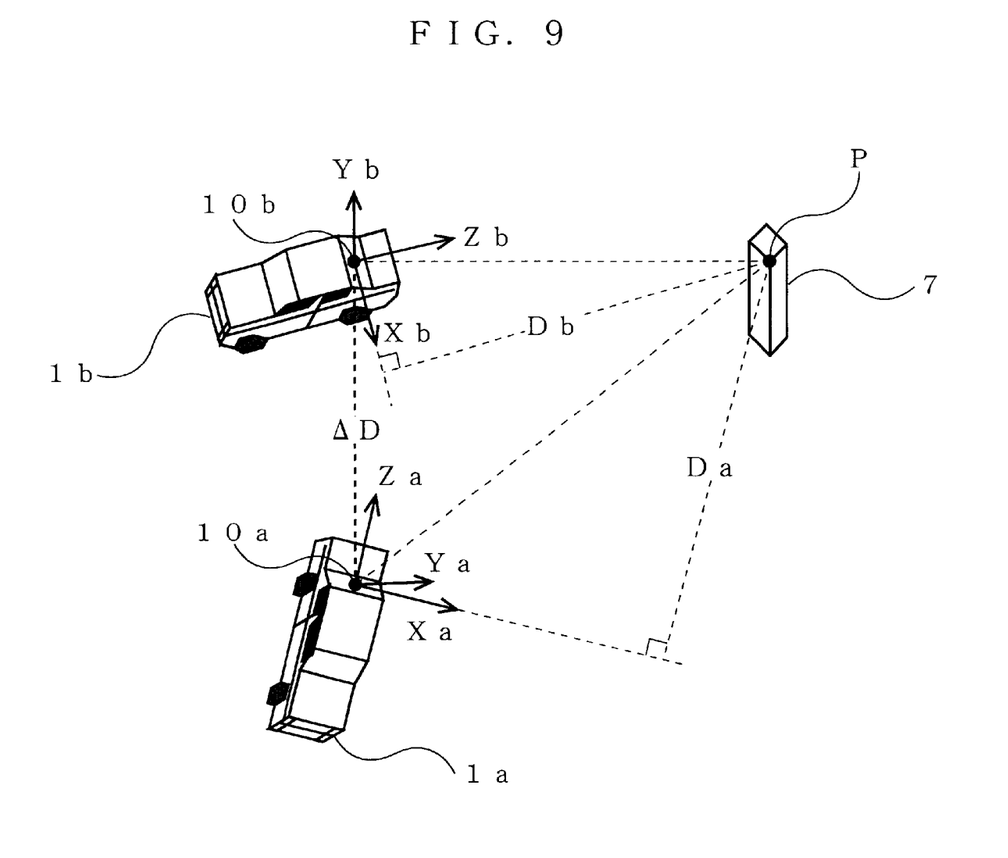
FIG. 9 is a diagram for assistance of explaining a method of calculating a distance to the 3D object when the driver wheeled the vehicle.
Figure 10A:
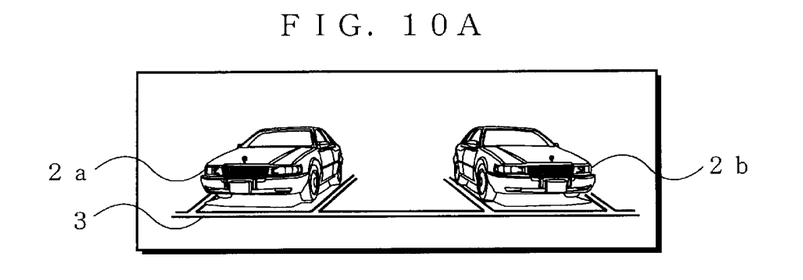
FIGS. 10a to 10c are diagrams for assistance of explaining a method of image creation for advising the driver of the distance to the 3D object.
Figure 10B:
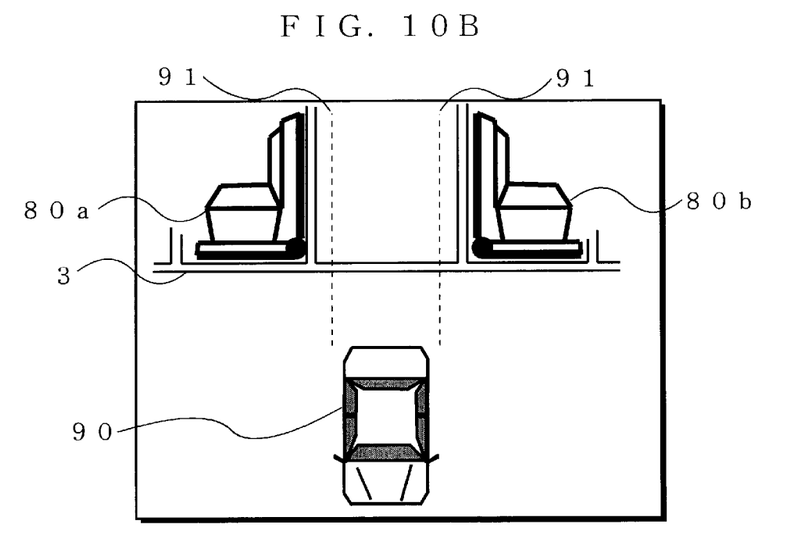
Figure 10C:
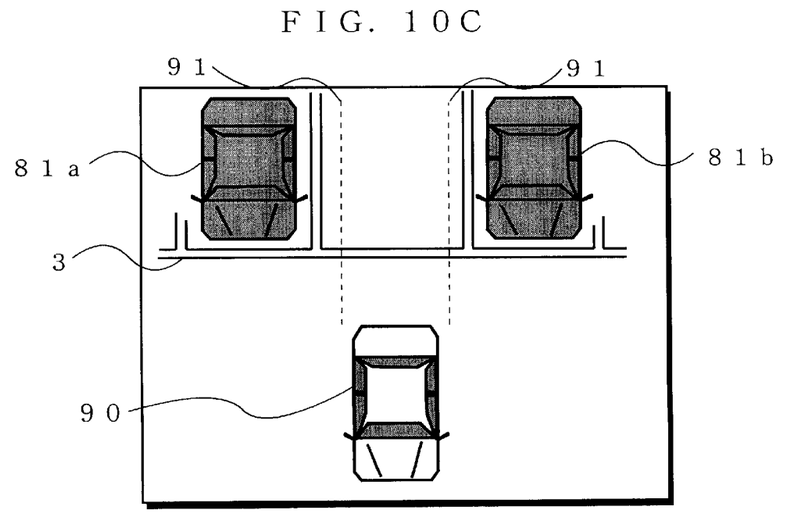

FIGS. 1 to 10c are diagrams showing a parking assistance system according to an embodiment of the present invention. Specifically, FIG. 1 shows the entire structure, FIG. 2 is a circuit block diagram, FIG. 3 is a flowchart for the comprehensive operation, and FIG. 4 is a flowchart for the operation of specifying a 3D object. Herein, the 3D object exemplarily includes a pillar, wall, another vehicle, and stroller located around a vehicle, and is defined as not including the ground or a white line drawn thereon. FIGS. 5a to 5d are diagrams for assistance of explaining image processing for specifying the 3D object, FIG. 6 is a flowchart for the operation of calculating a distance to the 3D object, FIGS. 7a and 7b are diagrams for assistance of explaining edge detection in the 3D object, FIG. 8 is a diagram for assistance of explaining a method of calculating a distance to the 3D object when a driver lets the vehicle go straight, FIG. 9 is a diagram for assistance of explaining a method of calculating a distance to the 3D object when the driver wheeled the vehicle, and FIGS. 10a to 10c are diagrams for assistance of explaining a method of image creation for advising the driver of the distance to the 3D object. With reference to FIGS. 1 to 10c, described below is an embodiment of the present invention.

In FIG. 1, the parking assistance system of this embodiment is mounted in a vehicle 1 such as an automobile, and includes an image pick-up 10, an image processing device 20, a display 30, a steering angle sensor 40, a wheel speed sensor 50, and a pulse counter 60. The parking assistance system is also provided with a start controller (not shown) for controlling its own start. The image pick-up 10 is exemplarily implemented by a single camera utilizing a solid image pickup device such as a charge-coupled device (CCD), and such camera is so mounted in the vehicle 1 as to face a rearward direction. The image picked up by the camera is inputted into the image processing device 20. The steering angle sensor 40 is equipped to detect data indicating a wheel angle of the vehicle 1, and the steering angle data detected thereby also goes to the processing device 20. The wheel speed sensor 50 is the one provided to detect a distance traveled by the vehicle 1, and obtained data which indicates the number of wheel rotations (hereinafter, wheel rotation data) is inputted, via the pulse counter 60, into the image processing device 20.

The image processing device 20 uses such data to calculate data specifying what 3D object is behind the vehicle 1 (hereinafter, object data), and then a distance between the specified 3D object and the vehicle 1. The image processing device 20 then converts the image provided by the camera into a view from above in order to help a driver easily perceive the distance to the 3D object. The calculated object data and distance data are both added onto the image. The image obtained thereby is then displayed on the display 30. The display 30 may be equipped with a speaker or a light-emitting device, for example, to warn the driver when the vehicle 1 approaches too close to the 3D object, that is, when the distance between the vehicle 1 and the 3D object becomes less than a predetermined threshold.

Described next is the internal structure of the image processing device 20. In FIG. 2, the image processing device 20 includes an analog/digital converter (hereinafter, ADC) 21, frame memories 22, 23, and 27, a CPU 24, RAM 25, ROM 26, and a controller 28. The ADC 21 converts an analog image picked up by the image pick-up 10 into a digital image, and provides the digital image data to the frame memory 22 or 23. The frame memories store the digital image data, and also forward the data to the CPU 24. Here, the digital image data stored in the frame memories 22 and 23 are each different image data, each picked up at different position. The ROM 26 previously stores programs for image conversion and for calculating a positional displacement of the vehicle 1, and the like. The program is loaded on the RAM 25, which is used as a working area for calculating the positional displacement, for example. The CPU 24 uses all of the digital image data, steering angle data, and the wheel rotation data so as to go through image processing following the program on the RAM 25. In this image processing, the object data and the distance from the vehicle 1 to the 3D object are both calculated. The digital image provided by the frame memory 22 or 23 is then converted into a view from above, onto which the two calculated data are to be added. The converted image is stored in the frame memory 27, and then outputted to the display 30 under the control of the controller 28 for display.

Described next is the comprehensive operation of the image processing device 20 with reference to a flowchart. Details about steps are left for later description. In FIG. 3, the CPU 24 determines whether the driver turned ON the parking assistance system with a starting switch SW, which is the start controller (step S110). If Yes, the CPU 24 starts its operation, and the procedure goes to step S120. If No, the parking assistance system is not started. Then, the CPU 24 specifies any 3D object in an image showing an area behind the vehicle (step S120), and then calculates the distance from the vehicle to the specified 3D object (step S130). The CPU 24 converts the image showing the area behind the vehicle into a view from above (step S140), and thereon, the CPU 24 adds the object data and the distance data. The 3D object is then displayed with emphasis given in the image thus obtained so the driver will notice (step S150). Lastly, the CPU 24 determines whether the driver turned OFF the starting switch SW (step S160). If Yes, this is the end of the operation of the parking assistance system, but if No, the procedure returns to step S120 and continues.

Note herein that, the start controller may detect a reverse signal in a transmission of the vehicle or deceleration of the vehicle to be greater than a predetermined threshold value, and in response thereto, the parking assistance system may automatically start. Further, the parking assistance system may be determined as being OFF in step S160 when the CPU 24 detects the vehicle has reached a speed higher than a predetermined threshold value. In this manner, the parking assistance system is set to automatically end its operation.

Next, the details about the steps are described stepwise. First, with reference to FIGS. 2, 4, and 5a to 5d, it is described how to specify a 3D object in step S120 in FIG. 3.

As already described, the flowchart of FIG. 4 shows the subroutine of step S120 of how to specify a 3D object. Referring to FIGS. 2 and 4, the image pick-up 10 sends an analog image A to the ADC 21. The analog image A represents a vehicle at a position a. The ADC 21 then subjects the analog image A to A/D conversion so as to store thus obtained digital image A in the frame memory 22 (step S121). The CPU 24 uses, for calculation, steering angle data received from the steering angle sensor 40 and wheel rotation data from the wheel speed sensor 50, which are both equipped in the vehicle. Here, a linear transit distance ΔD from the position a to b and a vehicle angle R during the transition as calculated (step S122). The CPU 24 then determines whether the linear transit distance ΔD is a predetermined threshold value or larger (step S123). If No, the procedure repeats step S122, and otherwise goes to step S124. The image pick-up 10 then sends an analog image B representing the vehicle at a position b to the ADC 21. The ADC 21 subjects the analog image B to A/D conversion so as to store thus obtained digital image B in the frame memory 23 (step S124).

For step S125 and onward, FIGS. 5a to 5d are referred to. FIG. 5a indicates the image A and FIG. 5b the image B, each including a 3D object 2 and white lines 3a and 3b drawn on the ground. The CPU 24 uses the linear transit distance ΔD and the vehicle angle R calculated in step S122 for projective transformation. That is, the image A representing the vehicle at the position a is projected onto the image B at the position b, and an image C is generated (step S125). To be more specific, the CPU 24 uses the data relevant to the vehicle's transition to subject the image A representing the vehicle at the position a to image conversion, and thus obtains such image C as shown in FIG. 5c, which is a view from the position b. By way of comparison, the white lines 3a and 3b in FIG. 5c are so converted as to coincide with those in FIG. 5b, but the 3D object 2 in FIG. 5c looks askew. This is because, in the projective transformation using the image A, the 3D object 2 is regarded as being on the same plane as the white lines 3a and 3b.

The CPU 24 then calculates a difference between the images B and C (step Si26). FIG. 5d shows the resultant image after the calculation, and reference numerals 4a and 4b therein denote regions, which are the differences between the 3D objects 2 in the images B and C. The white lines 3a and 3b do not remain by extracting such differences. That means, due to the extraction of the differences between the images B and C, only the 3D object 2 is left behind. The CPU 24 then outputs the object data as specified above (step S127).

With reference to FIG. 2 and FIGS. 6 to 8, described next is step S120, calculating the distance from the vehicle to the 3D object. Herein, as already mentioned, FIG. 6 is a subroutine flowchart for calculating such distance.

In FIGS. 2 and 6, the CPU 24 subjects the 3D object specified in the images A and B to edge detection by utilizing data of image A in the frame memory 22, data of image B in the frame memory 23, and the object data (step S131). In FIGS. 7a and 7b, the specified 3D object is a vehicle 5 exemplarily subjected to edge detection. As to the image representing the vehicle 5, analyzed first is a luminance distribution pattern (may be colored distribution pattern) and then difference in luminance among pixels. A determination is then made as to whether the difference in luminance is equal to or larger than a predetermined threshold value. In this manner, edges 6a to 6f are detected as shown in FIG. 7a. FIG. 7b shows such detected edges 6a to 6f for the sake of clarity. As such, the CPU 24 subjects the 3D object specified by the images A and B to edge detection, and then the procedure goes to step S132.

In FIG. 6, the CPU 24 refers to the edges detected in the images A and B in step S131 to detect any identical edge in pairs (step S132). This edge detection is carried out under the method conventionally used to calculate the hamming distance, for example, by comparing the images A and B in luminance or color pattern. Note that, the CPU 24 can estimate which edge in the image A is located at where in the image B with the help of the linear transit distance ΔD and the vehicle angle R of the vehicle. Accordingly, the CPU 24 goes for image analysis only for the estimated part of the image, and the amount of calculation utilized for the edge detection is thus reduced.

Next, the CPU 24 calculates the distance in each of the images for the identical edges detected in step S132 (step S133). The distance is from a center position of each of the images to each of those edges, and is indicated by coordinates, for example.

As to step S134, FIGS. 8 and 9 are referred to. FIG. 8 shows the method of calculating the distance from the vehicle to the 3D object when the driver has the vehicle going straight ahead (or go backward), in other words, when the vehicle moves in the Z direction without being turned. The method is described next below with reference to FIG. 8.

In FIG. 8, assuming that the method is the one for calculating a distance D from the vehicle equipped with the image pick-up 10 to a point P on an edge of a 3D object 7. Herein, reference numerals 7a and Pa indicate where the 3D object 7 and the point P are to be each positioned when the vehicle is located at the position a. Similarly, reference numerals 7b and Pb indicate where the 3D object 7 and the point P are to be each positioned when the vehicle is located at the position b. In FIG. 8, the position of the image pick-up 10 is taken as a reference, and shows the position change of the 3D object 7 and the point P. Specifically, if the vehicle transits from the position a to b by the linear transit distance ΔD, the 3D object 7 and the point P move from 7a and Pa to 7b to Pb, respectively. In FIG. 8, the 3D object 7 should have been taken as a reference so that the vehicle equipped with the image pick-up 10 is described as moving in the Z direction by the linear transit distance ΔD. For the sake of convenience, however, the image pick-up 10 is taken as the reference so that the 3D object 7 and the point P are the ones moving by the linear transit distance ΔD.

Assuming a focal distance for the image pick-up 10 being f, images of the 3D object 7 and the point P are projected onto a projection surface, which is away from the image pick-up 10 by the focal distance f. That means, the images of the 3D object 7 and the point P positioned at 7a and Pa, respectively, are projected on the image A as a 3D object 7'a and a point P'a. Similarly, those positioned at 7b and Pb are projected on the image B as a 3D object 7'b and a point P'b. Although the image shown in FIG. 8 is the combination of the images A and B for convenience, it is not practically necessary in the operation of the parking assistance system.

Described next is the method of calculating the distance D from the vehicle to the point P on the edge of the 3D object 7. Assuming that each center of the images A and B picked up by the image pick-up 10 is O, the distance D is expressed as $$D = \Delta D * u / v$$

where a distance from the center O to the point P'a is u, and a distance from the point P'a to P'b is v. Here, since the linear transit distance ΔD of the vehicle has already been calculated in step S122, the CPU 24 only needs to calculate the distance from the point P'a to P'b in each image to obtain the distance between the image pick-up 10 to the point P. Note herein that, since the edge is the collection of points, calculating the distance to the point P for such edge leads to the distance distribution of the edges.

FIG. 9 is a diagram for assistance of explaining a method of calculating a distance from the vehicle to the 3D object when the driver turns the vehicle. The method is described next below.

In FIG. 9, the vehicle 1 is assumed to move from the position a to b by the linear transit distance ΔD at the vehicle angle of R (not shown). Reference numerals 1a and 1b therein indicate the vehicle 1 being at the positions a and b, respectively. The vehicle 1 is equipped with the image pick-up 10 whose coordinate optical axes at the position a are Xa, Ya, and Za, and those at the position b are Xb, Yb, and Zb. Herein, all of X, Y, and Z denote directions, specifically Z denotes a direction of the optical axis, X denotes a horizontal direction, and Y denotes a vertical direction. The 3D object to calculate the distance from is here the point P on the edge of the 3D object 7. Next is, described is the method of calculating a distance Db from the vehicle 1b to the point P.

As already described, the CPU 24 has calculated the vehicle angle R and the linear transit distance ΔD of the vehicle in step S122. Therefore, an equation can be established if the vehicle angle R is expressed by an orthonormal matrix of 3 by 3 and the transit distance ΔD by offset vector.

$$R = \begin{vmatrix} r_{11} & r_{12} & r_{13} \\ r_{21} & r_{22} & r_{23} \\ r_{31} & r_{32} & r_{33} \end{vmatrix}$$

$$\Delta D = (r_{14} \; r_{24} \; r_{34})$$

Here, presumably, in the image A picked up by the image pick-up 10 at the position a, coordinates of the point P are (x'a, y'a), and those in the image B are (x'b, y'b). Moreover, the following equations are established, where the focal distance of the image pick-up 10 is presumed to be f, a distance from the image pick-up 10a to the point P is Da, and that from the image pick-up 10b to the point P is Db:

$$\left(r_{11}\frac{x \cdot a}{f} + r_{12}\frac{y \cdot a}{f} + r_{13}\right)Da + r_{14} = \frac{x \cdot b}{f}Db$$

$$\left(r_{21}\frac{x \cdot a}{f} + r_{22}\frac{y \cdot a}{f} + r_{23}\right)Da + r_{24} = \frac{y \cdot b}{f}Db$$

$$\left(r_{31}\frac{x \cdot a}{f} + r_{32}\frac{y \cdot a}{f} + r_{33}\right)Da + r_{34} = Db$$

With these equations, the distance Db will be:

$$Db = \left\{ \frac{(r_{34}x \cdot b - fr_{14})(r_{34}x \cdot a + r_{32}y \cdot a + fr_{33})}{r_{11}x \cdot a + r_{12}y \cdot a + fr_{13} - x'b(r_{31}x \cdot a + r_{32}y \cdot a + fr_{33})} \right\} + r_{31}$$

As such, even if the driver turns the vehicle, the CPU 24 first calculates the coordinates of the point P in each of the images, and then the distance from the vehicle to the point P utilizing the data which indicates the linear transit distance ΔD and the vehicle angle R. Since the edge is the collection of points, the CPU 24 calculates the distance to the point P for such edge, leading to the distance distribution of the edges.

As is known from the above, the CPU 24 calculates the distance from the vehicle to the edge utilizing the vehicle angle R and the linear transit distance ΔD (step S134).

Next, the CPU 24 checks whether such edge detected in step S131 has been subjected to a calculation of distance from the vehicle (step S135). If Yes, the procedure goes to step S138, and if not yet, goes to step S136.

The CPU 24 then checks if the not-yet-calculated edge is the one detected in step S132 as being the identical (step S136). If Yes, the procedure repeats the flow starting from step S133. If the image has any edge not yet calculated and not found its pair, the procedure goes to step S137, and the edge is deleted from the image. The procedure then goes to step S138.

Lastly, the CPU 24 outputs data indicating the distances from the vehicle to each of the edges and the shape of edges (step S138). This is the end of the flow.

Described next is step S140 in FIG. 3, creating an image a which is a view from the above. In FIG. 2, by using the data of the image B stored in the frame memory 23, the CPU 24 subjects the image B to image conversion such as affine transformation so as to convert the image into the image α, a view from the above (step S140). As already described, although the 3D object in the image B converted askew in the image α, the CPU 24 already has specified and detected the 3D object. With the object data, the 3D object is thus deleted from the image α.

Next, described is step S150 in FIG. 3, emphasizing the 3D object in the image α for display. FIGS. 10a to 10c are diagrams for assistance of explaining such method of giving emphasis to the 3D object.

FIG. 10a shows the image B picked up by the image pick-up 10 at the position b. The image B includes 3D objects 2a and 2b and a white line 3. In the above step S140, in the process of converting the image B into the image a viewed from the above, the 3D objects 2a and 2b become askew and not precise, and thus are deleted therefrom. Accordingly, the CPU 24 adds these 3D objects onto the image a while emphasizing the shape thereof in such manner as to tell the driver how far those 3D objects really are (step S150). In this example, the CPU 24 utilizes the data indicating the distance to the edge of the 3D object outputted in step S138 and the shape of edges so as to add these 3D objects onto the image α. Next below, the object data to be added onto the image α is described.

Here, in step S130, the CPU 24 detects the edges of the 3D object, and then calculates the distance for every edge from the vehicle. In step S150, the CPU 24 adds data indicating the shape of edges and the distance from the vehicle to each of the edges onto the image α. FIG. 10b shows an image β obtained by adding edge data 80a and 80b of the 3D objects 2a and 2b onto the image α. The edge data 80a and 80b correctly indicate the distance from the vehicle, and thus is displayed precisely in the image β. In the edge data 80a and 80b displayed in the image β, the CPU 24 may emphasize edges, at the tip thereof, color, line width, or the like, in the vicinity of the vehicle so as to let them stand out to warn the driver.

A vehicle model 90 indicates the position and dimension of the vehicle. Here, as is equipped in the vehicle, the image pick-up cannot pick up an image of the vehicle in its entirety. In this sense, the image β is not complete, and thus the driver may have hard time to grasp the actual distance from the vehicle to the edge data 80a and 80b. To get around such problem, the CPU 24 fixes the position of the vehicle model 90 on the display. This vehicle model 90 is created by previously setting data indicating where the image pick-up is equipped in the vehicle, and the dimension of the vehicle. The CPU 24 may use the data from the steering angle sensor 40 to display, on the image β, a guidance path for the vehicle and its estimated trail 91. Such created image β is outputted from the CPU 24 shown in FIG. 2, and is stored in the frame memory 27.

FIG. 10*c* shows an image γ, which makes the driver grasp the actual distance with ease compared with the image β. On the image γ, 3D object models 81*a* and 81*b* are pasted instead of the edge data 80*a* and 80*b*. The 3D object models 81*a* and 81*b* are selected from among a collection of 3D object models including any possible vehicle, wall, pillar, stroller, and the like, expected at parking. Prior thereto, the CPU 24 determines the type of 3D object based on shape of edges, for example, indicated by the edge data 80*a* and 80*b*. Note herein that, any part difficult to identify its type may be displayed as an object region, or left as being the edge data. As such, as the image β being added with the close-to-actual 3D object models, it becomes easier for the driver to perceive the distance between the 3D object and the vehicle. The CPU 24 may use the data from the steering angle sensor 40 to display, on the image β, a guidance path for the vehicle and its estimated trail 91. Such created image γ is also outputted from the CPU 24 shown in FIG. 2, and is stored in the frame memory 27.

Here, the driver may determine which image of β or γ is to be outputted from the CPU 24, or the CPU 24 may automatically determine by seeing how the edge data and the 3D object model coincide with each other.

As is known from the above, the parking assistance system of the embodiment is fixedly provided with a single image pick-up, which picks up two images at different times and locations. The parking assistance system thus carries out triangulation with respect to a 3D object. Accordingly, the parking assistance system has no more need to fixedly attach several image pick-ups with considerable accuracy, especially in angle, direction, interval, and the like, and thus one image pick-up will do. Further, as it previously calculates the transit distance or heading direction of the vehicle, the parking assistance system thus can estimate the position where the 3D object is displayed in the image. In this manner, the amount of calculation used to search for any identical 3D objects in two images can be reduced, and hardware structure is simplified. Still further, in order to display object data for the driver, the parking assistance system converts an image showing an area around the vehicle into a view from the above without causing the image to be askew. Also in thus obtained image, the 3D object is located at a precise distance, allowing the driver to perceive the actual distance from the vehicle to the 3D object. Needless to say, the parking assistance system can be effectively utilized by mounting the image pick-up at the rear part of a large-sized vehicle, which has many blind spots.

While the invention has been described in detail, the foregoing description is in all aspects illustrative and not restrictive. It is understood that numerous other modifications and variations can be devised without departing from the scope of the invention.

What is claimed is:

1. A parking assistance system for assisting a driver of a vehicle to park by picking up an image around the vehicle, and advising the driver of what 3D object is located therearound, said parking assistance system comprising:
    an image pick-up having a single camera, said image pick-up being operable to pick up, during a transition of the vehicle, a first image and a second image around the vehicle at a first location and time and a second location and time, respectively;
    an object specification part being operable to detect and specify the 3D object found in each of the first image and the second image;
    a vehicle position calculation part being operable to calculate transition data of the vehicle from the first location to the second location;
    an object distance calculation part being operable to calculate a distance from the vehicle to the 3D object by using a position of the 3D object in each of the first image and the second image, and the transition data of the vehicle; and
    an image creation part being operable to create a third image for display to the driver based on the first image and the second image picked up by said image pick-up and data calculated by said object distance calculation part.

2. The parking assistance system according to claim 1, wherein said object distance calculation part
    detects an edge of the 3D object from each of the first image and the second image; and
    calculates the distance from the vehicle to the edge of the 3D object by using coordinate data of any edge identical in the first image and the second image and the transition data of the vehicle.

3. The parking assistance system according to claim 2, wherein said object distance calculation part further
    estimates a position of the edge identical in the first image and the second image by using the transition data of the vehicle, and
    detects the identical edge by positionally subjecting the estimated edge to image analysis.

4. The parking assistance system according to claim 1, wherein said image creation part
    converts one of the first image and the second image picked up by said image pick-up into a view from above, and
    creates the third image by adding the data calculated by said object distance calculation part onto the view from above.

5. The parking assistance system according to claim 4, wherein said image creation part perceivably emphasizes, out of the data calculated by said object distance calculation part, a part of the object in a vicinity of the vehicle.

6. The parking assistance system according to claim 4, wherein said image creation part generates the third image by converting the data calculated by said object distance calculation part into a 3D object model, and by adding the 3D object model onto the view from above.

7. The parking assistance system according to claim 4, wherein said image creating part additionally adds a model of the vehicle onto the third image.

8. The parking assistance system according to claim 1, wherein said object specification part further
    creates a fourth image by projecting the first image onto the second location for transformation, and
    detects and specifies the 3D object by taking a difference between the fourth image and the second image.

9. The parking assistance system according to claim 1, wherein said object specification part
    creates a fourth image by projecting the second image onto the first location for transformation, and
    detects and specifies the 3D object by taking a difference between the fourth image and the first image.

10. The parking assistance system according to claim 1, wherein the transition data of the vehicle includes a linear transit distance and a vehicle angle of the vehicle, and
    said vehicle position calculation part calculates the linear transit distance and the vehicle angle based on data obtained from a steering angle sensor and wheel speed sensor via a pulse counter equipped in the vehicle.

11. The parking assistance system according to claim 1, wherein said image pick-up is mounted in the vehicle so as to face a rearward direction.

12. The parking assistance system according to claim 1, further comprising a display operable to display the third image to the driver.

13. The parking assistance system according to claim 1, further comprising a speaker being operable to generate a sound when the distance from the vehicle to the 3D object calculated by said object distance calculation part is shorter than a predetermined distance.

14. The parking assistance system according to claim 1, further comprising a light emitter being operable to generate light when the distance from the vehicle to the 3D object calculated by said object distance calculation part is shorter than a predetermined distance.

15. The parking assistance system according to claim 1, wherein said image pick-up starts picking up an image in response to a manual operation of the driver of the vehicle.

16. The parking assistance system according to claim 1, wherein said image pick-up starts picking up an image when the vehicle decelerates to a speed slower than a predetermined speed.

17. The parking assistance system according to claim 1, wherein said image pick-up starts picking up an image when the vehicle goes in reverse.

* * * * *